United States Patent

Mokdad et al.

[11] Patent Number: 5,934,654
[45] Date of Patent: Aug. 10, 1999

[54] TORSION DAMPING DEVICE

[75] Inventors: Ayman Mokdad; Giovanni Grieco, both of Saint-Quen, France

[73] Assignee: Valeo, Paris, France

[21] Appl. No.: 08/652,489

[22] PCT Filed: Sep. 28, 1995

[86] PCT No.: PCT/FR95/01249

§ 371 Date: May 28, 1996

§ 102(e) Date: May 28, 1996

[87] PCT Pub. No.: WO96/10141

PCT Pub. Date: Apr. 4, 1996

[30] Foreign Application Priority Data

Sep. 28, 1994 [FR] France .................................. 94/11572

[51] Int. Cl.⁶ .................................................. B60G 13/00
[52] U.S. Cl. .......................... 267/196; 192/213.3; 74/574
[58] Field of Search .................... 267/196, 154, 267/277, 273, 280, 161, 162; 192/213.31, 213.3, 213.22; 74/574; 464/68

[56] References Cited

U.S. PATENT DOCUMENTS

| 3,817,362 | 6/1974 | Rist | 192/213.31 X |
| 4,036,341 | 7/1977 | Beeskow et al. | 192/213.31 |
| 4,044,874 | 8/1977 | Worner | 192/213.31 |
| 4,739,866 | 4/1988 | Reik et al. | 74/574 X |
| 4,782,933 | 11/1988 | Jackel et al. | 74/574 |
| 5,269,725 | 12/1993 | Maucher et al. | 74/574 X |

FOREIGN PATENT DOCUMENTS

| 0554758 | 9/1986 | Australia . |
| 2628807 | 9/1989 | France . |
| 2430160 | 2/1975 | Germany . |

Primary Examiner—Robert J. Oberleitner
Assistant Examiner—Pamela J. Lipka
Attorney, Agent, or Firm—Liniak, Berenato, Longacre & White

[57] ABSTRACT

A double damping flywheel for a motor vehicle, comprising two coaxial masses mounted movably in relation to one another in opposition to a resilient member and a friction member (51–55). A bearing part (60) is provided between the masses, integral with one of the said masses, and for the most part receives the friction means. The bearing part (60) comprises a shoulder engaging (60B) with teeth (62) designed to be edged so as to keep a stack of washers (51–55) in position, each tooth (62) being framed by stabilising lugs (70) allowing the bending operation to be assisted by a matrix of tools.

1 Claim, 2 Drawing Sheets

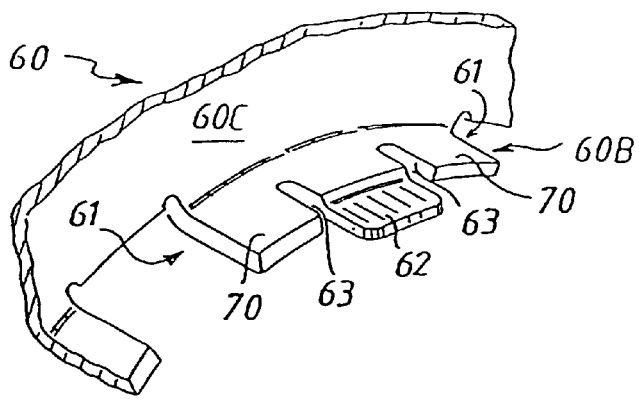
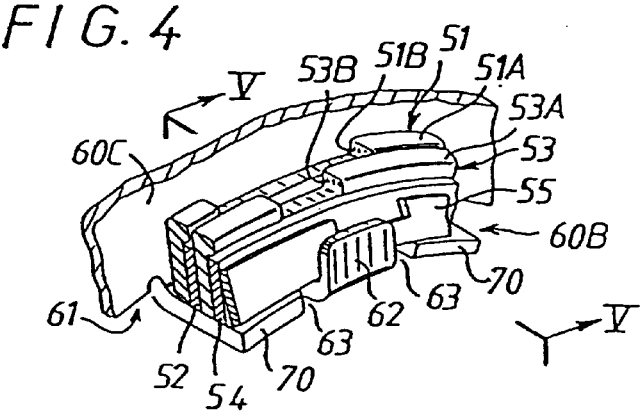
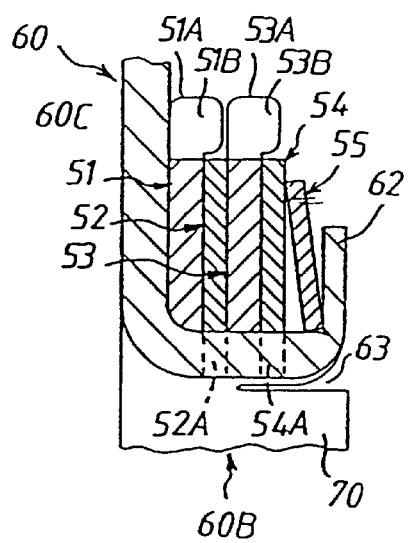
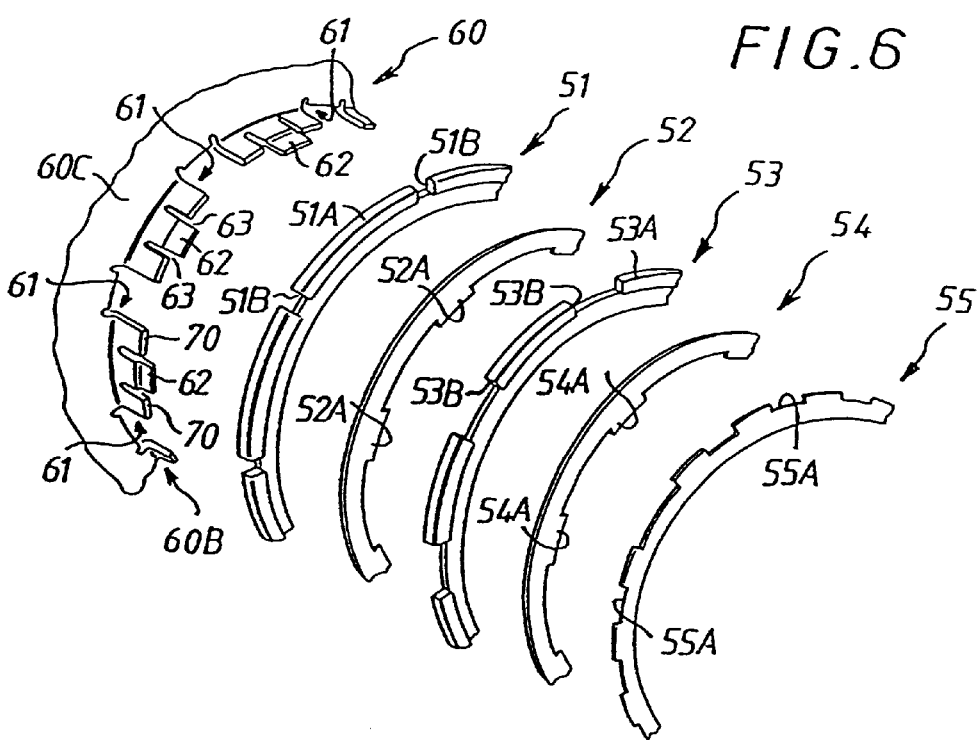

TORSION DAMPING DEVICE

BACKGROUND OF THE INVENTION

1. Field of the Invention

The invention relates to a torsion damping device, especially a double damping flywheel forming a torque transmission device for a motor vehicle, of the type comprising two coaxial masses mounted movably in relation to one another in opposition to resilient means and friction means.

2. Description of the Prior Art

A torsion damping device is known which comprises a first mass intended to be fixed to a driving shaft, such as for example the crankshaft of the engine of a motor vehicle, and a second mass forming a reaction plate for a friction clutch, where the friction means are provided in a strengthening bearing part which extends between the first mass and the second mass. For this purpose, the bearing part comprises an axial shoulder provided with teeth which can be edge-formed, which serves to house a friction washer and a meshing washer biased for example by a Belleville washer, the teeth being edge-formed by means of a matrix of tools once the washers are in position. One may consider making the teeth thinner in relation to the shoulder and extending them in the shoulder by cut-outs so that the bending operation is facilitated.

However, the result after bending is not entirely satisfactory: the teeth are often twisted. Moreover, if the number of washers is increased in order to modulate the friction characteristics, the axial dimension of the teeth is lengthened, making twisting even more probable.

The object of the invention is in particular to remove this drawback.

SUMMARY OF THE INVENTION

The present invention provides a torsion damping device, especially a double damping flywheel for a motor vehicle, comprising two coaxial masses mounted movably in relation to one another in opposition to resilient means and friction means, a bearing part being provided between the said masses, integral with one of the said masses, and receiving for the most part the said friction means, the said bearing part comprising a punched annular shoulder engaging with teeth designed to be edge-formed so as to keep the friction means in position, characterised in that each tooth is framed by so-called stabilising lugs allowing the bending operation to be assisted by a matrix of tools.

Thanks to the presence of lateral lugs, the bending of each tooth is enclosed, therefore stabilised, and is performed without twisting. Moreover the teeth can now be lengthened, without a risk of twisting, in order to increase the thickness of the package of washers, here for example with the aim of installing two or more friction washers with different clearances and thus better to control the damping characteristics.

BRIEF DESCRIPTION OF THE DRAWINGS

The invention will be better understood in the light of the following description of an exemplified embodiment, this description being made with reference to the attached drawings on which:

FIG. 3 is a partial perspective view of the bearing part shown on FIGS. 1 and 2;

FIG. 4 is a perspective view showing the friction means installed in the bearing part;

FIG. 5 is a sectional view along line V—V of FIG. 4; and

FIG. 6 is an exploded view showing components of FIGS. 4 and 5.

DETAILED DESCRIPTION OF THE PREFERRED EMBODIMENT

Figure 1:
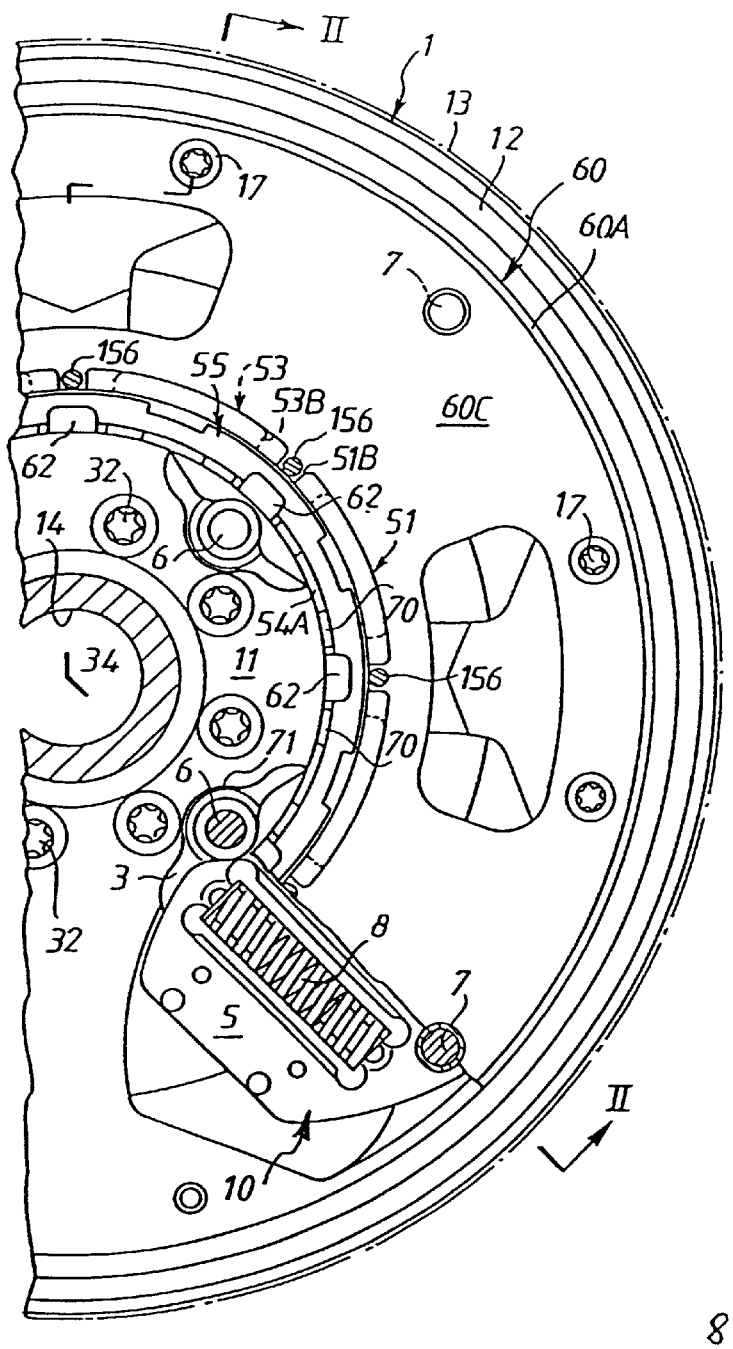
FIG. 1 is a front sectional view, locally cut away, of a double damping flywheel with a device according to the invention, along line I—I of FIG. 2.
Figure 2:
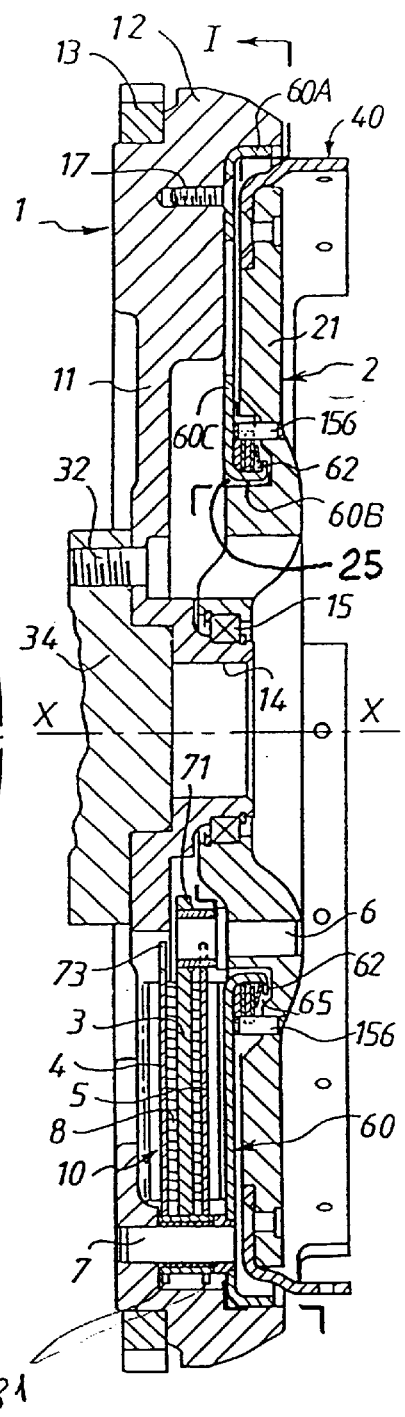
FIG. 2 is an axial sectional view along line II—II of FIG. 1.

On FIGS. 1 and 2 a double damping flywheel for a motor vehicle is illustrated, comprising two coaxial masses 1 and 2 mounted movably in relation to one another in opposition to radially acting resilient means and axially acting friction means. These resilient and friction means will be described in detail further on.

The two masses 1 and 2 rotate in relation to one another around the axial axis of symmetry X—X.

The first mass 1 comprises, here in a single piece, a plate 11 and a tubular central hub 14 around which the mass 2 is rotationally mounted.

The second mass 2 also comprises a plate 21 extending parallel to the plate 11.

A bearing, here a ball bearing 15, as a variant a plain bearing, is interposed between the outer periphery of the hub 14 and the inner periphery of the plate 21.

The plate 21 of the second mass 2 forms the reaction plate of a friction clutch comprising, in a manner known per se and not represented here, a pressure plate, a diaphragm, a cover and a driven plate assembly.

An annular part 40 serving in a manner known per se for fixing the cover of the clutch (not represented) is fixed by riveting to the periphery of the reaction plate 21.

The first rotating mass 1 is connected by screws 32 through the inner periphery of its plate 11 to a driving shaft 34, for example the crankshaft of an internal combustion engine of the motor vehicle, whereas the second rotating mass 2 is rotationally connected by means of the clutch pressure plate mechanism and the driven plate assembly (not represented) to a driven shaft, the primary shaft of the gearbox of the vehicle.

The plate 11 of the first mass 1 is extended in a single piece on its outer periphery by an axially oriented cylindrical skirt 12.

On its outer periphery the mass 1 bears a starter gear ring 13 intended to be driven by the pinion of a starter (not represented).

The resilient damping means comprise resilient elements 8 here formed by coil springs. They generally act radially between the plates 11 and 21 and are mounted in articulated cassettes 10 comprising in a manner known per se a disc 3 provided with seats for the mounting in parallel of two springs 8 and, secondly, two guide washers 4 and 5 disposed on either side of the disc 3 and also having seats opposite the seat of the disc 3 for the mounting of the said springs 8. Here the seats consist of slots.

The guide washers 4, 5 are laterally fixed by riveting to one another. The disc 3 and the guide washers 3, 4 are mounted head to tail, the disc 3 having on its inner periphery an extension 71 for mounting a hinge pin 6 on the mass 2 (see FIG. 1) whereas the guide washers 4 and 5 also have an extension 81 on their respective outer periphery opposite one another, for mounting a hinge pin 7 on the mass 1.

A so-called bearing part 60 is provided between the masses 1 and 2 (see FIG. 2) and is fixed to the outer periphery of the plate 11, here by means of screws 17, and as a variant by riveting. It covers and strengthens the plate 11.

The bearing part 60, which here is metallic, for example made of buckled plate, has at its outer periphery an axially oriented shoulder 60A following the shape of the skirt 12 of the mass 1. On its inner periphery, it also has a shoulder 60B, similarly axially oriented, which comes to be housed in a recess 25 of the mass 2 provided for this purpose. As can better be seen from FIG. 6, the shoulder 60B is provided with slots 61 forming notches and with teeth 62 extending it in the axial direction. The teeth 62, initially in the alignment of the shoulder 60B, are intended in fact to be folded radially in relation to the axis X—X, here radially in the direction opposite to the axis of the assembly (as represented for example on FIGS. 4 and 5).

The shoulder 60B with its teeth 62 is intended to house friction means. A first rotating friction washer 51, a first tightly meshing application washer 52, a second rotating friction washer 53, a second tightly meshing application washer 54 and a Belleville washer 55, as a variant a resilient crinkle washer, bearing directly on the teeth 62 to exert an axial force on the package of washers, are situated in succession axially between the base 60C of the transversal portion of the bearing part 60 and the teeth 62.

On their inner periphery the washers 52 and 54 have lugs 52A and 54A forming tenons engaged in the notches 61 of the bearing part 60 (see FIGS. 5 and 6). They are thus rotationally immobilised in relation to the mass 1.

On their outer periphery the rotating friction washers 51 and 53 have reinforcing zones in the form of excess thicknesses 51A, 53A respectively with slots respectively 51B and 53B capable of cooperating loosely with pins 156 borne by the mass 2 radially inside the annular zone of the reaction plate 21 intended to cooperate with the driven plate assembly (not represented) of the clutch. The reinforcements extend around the interposed washers 52 and 54, as can better be seen on FIG. 5.

As can be clearly seen on FIGS. 4 and 6, the slots 51B of the first friction washer have a greater width circumferentially than slots 53B of the second friction washer, thus producing a two-stage hysteresis device. The friction washers 51 and 53 are in other words meshed with different displacement clearances with the pins 156 of the mass 2. The washers 51, 53 are advantageously made of synthetic material.

The Belleville washer 55 also has slots 55A delimiting the contact and force application zones on the adjacent application washer 54. It will be noted that the bearing part 60 bears for the most part the friction means, only the pins 156 are borne by the second mass.

On FIG. 3, the bearing part 60 has been partially shown before the positioning of the stack of washers and before bending the teeth 62. As can be clearly seen on this figure, the shoulder 60B has a structure meshing with an alternance of slots 61 (the above-mentioned notches 61) and teeth 62 bordered by stabilising lugs 70.

The teeth 62 are made thinner in relation to the shoulder 60B of the part 60. Notches 63 provided on either side of the teeth 62 enable the bending operation to be facilitated.

In accordance with the invention, to assist further the bending of the teeth 62, two so-called stabilising lugs 70 have been provided on either side of each tooth 62, defined on one side by a notch 63 and on the other by the slot 61. These lugs form bearing means for the tools (not represented), which enable the bending of the teeth to be controlled by a solid guide.

It will be possible to perform this bending operation in a manner known per se: after the bearing part has been placed on a table, a tool matrix will act by firstly forcing back the Belleville so as to free the lateral lugs for the bearing/support of guide elements for the tooth bending tools.

It goes without saying that refinements are possible, especially the stacking of washers could be provided no longer against the inner edge 60B of the bearing part 60 but against the radially outer edge 60A (see FIG. 2). The pins 156 may be replaced by axial projections of the plate 21.

Instead of being provided between the two masses of a double damping flywheel, the arrangement according to the invention could be provided between the hub and one of the guide washers of a driven plate assembly comprising two guide washers resiliently coupled to the hub. The bearing washer may be integral with one of the guide washers and the hub may have projections meshing with the friction washers, or in any other rotating devices which dampen the torsional vibration. Thus the springs 8 may act circumferentially.

As a reminder, it will be recalled that in operation the hinged cassettes 10 are inclined and that the springs 8 are compressed. In a first stage, the washer 53 acts and rubs on the washers 54, 52 as it is driven (after the clearance between the pins 156 and the slots 53B is taken up) by the second mass 2. In a subsequent step, the washer 51 acts and rubs on the bearing part 60 and the washer 52 after taking up the clearance between the slots 51B and the pins 156.

We claim:

1. A torsion damping device comprising two coaxial masses (1, 2) mounted movably in relation to one another in opposition to a resilient means (8) and a friction means (51–55), a bearing part (60) being provided between said masses (1, 2), integral with one of said masses (1), and receiving said friction means, said bearing part comprising a shoulder (60B) engaging with teeth (62) provided to be edge-formed so as to keep a stack of washers in position, wherein each tooth (62) is framed by stabilising lugs (70) allowing a bending operation to be assisted by a matrix of tools; said friction means includes a rotating friction washer (51) loosely meshed with a plurality of pins (156) integral with one of said masses (2), and a tightly meshing washer (52) by the other mass (1) by means of tenons (52A) tightly engaged in said slots (61) of the bearing part (60) and a Belleville washer (55) adapted to exert an axial force on said friction washer (51) and said meshing washer (52); said friction means comprises two friction washers (51, 53) and two tightly meshing washers (52, 54), the two friction washers (51, 53) being meshed with different clearances with said pins (156) so as to produce two hysteresis stages; and wherein a nearest friction washer (53) closest to one of said teeth has slots (53B) having a smaller width circumferentially than slots provided on the friction washer (51) which are disposed proximate the base (60C) of the bearing part (60).

* * * * *